No. 672,392. Patented Apr. 16, 1901.
J. C. BLAIR.
FOUNTAIN SPITTOON.
(Application filed Aug. 13, 1900.)
(No Model.)
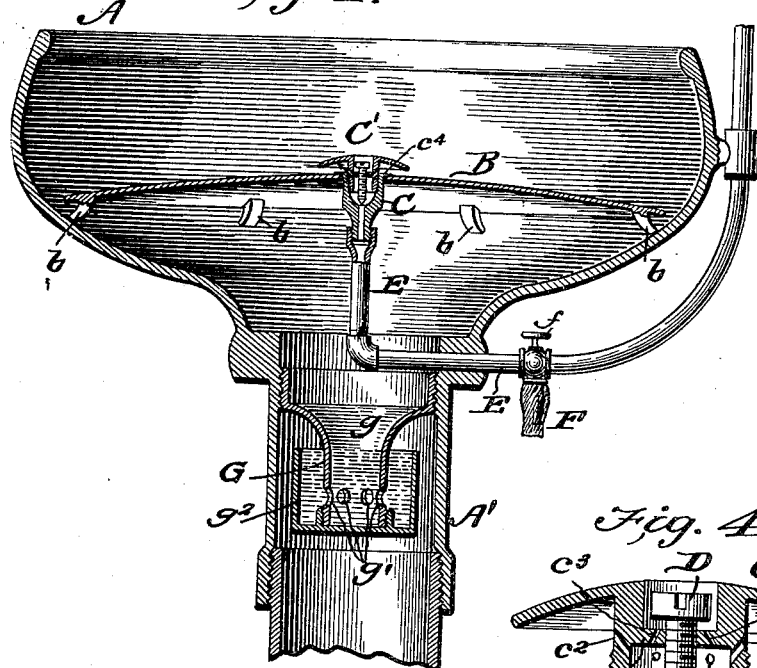
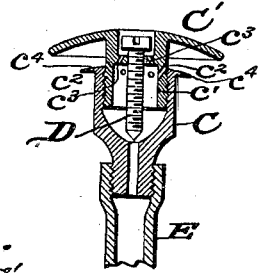
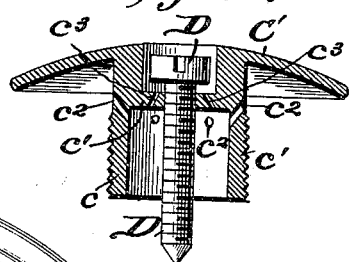
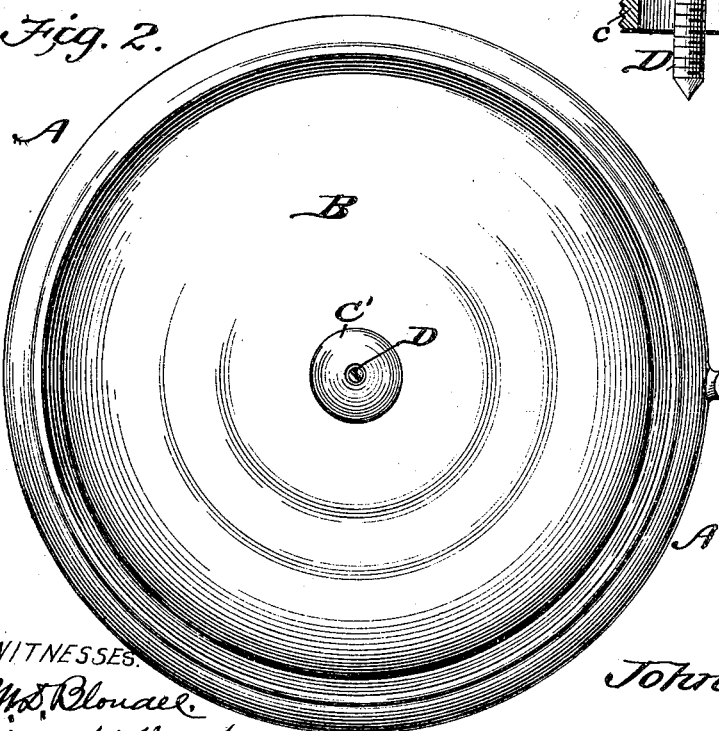
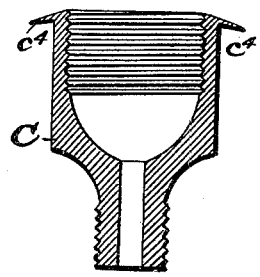
WITNESSES.
M. S. Blondell.
Amos W. Hart.
INVENTOR
John C. Blair.
BY Munn & Co.
ATTORNEYS
THE NORRIS PETERS CO., PHOTO-LITHO., WASHINGTON, D. C.

UNITED STATES PATENT OFFICE.

JOHN CARLISLE BLAIR, OF LOUISVILLE, KENTUCKY, ASSIGNOR OF ONE-HALF TO ROBERT WEDEKIND, OF SAME PLACE.

FOUNTAIN-SPITTOON.

SPECIFICATION forming part of Letters Patent No. 672,392, dated April 16, 1901.

Application filed August 13, 1900. Serial No. 26,723. (No model.)

*To all whom it may concern:*

Be it known that I, JOHN CARLISLE BLAIR, residing at Louisville, in the county of Jefferson and State of Kentucky, have made certain new and useful Improvements in Fountain-Spittoons, of which the following is a specification.

My invention is an improvement on the fountain-spittoon for which I have received Letters Patent No. 575,629.

The features of novelty are hereinafter described in general and specifically indicated in the claims.

In the accompanying drawings, Figure 1 is a vertical section showing the application of my improvements to the bowl of the spittoon. Fig. 2 is a plan view of the same. Fig. 3 is an enlarged vertical section of the water-spreader and valve attachment therefor. Fig. 4 is a still more enlarged view of the water-spreader and its valve, and Fig. 5 is an enlarged section of the valve-seat and socket and holder for the spreader.

A indicates the bowl, which is constructed of steel, cast-iron, or brass, having a porcelain or other vitreous or enamel finish internally or externally. The concavo-convex disk B, having its convex side uppermost, is arranged in the lower portion of the bowl and made of such diameter that its circular edge approaches near the side of the bowl. This disk is preferably constructed of glass or of thin iron having a porcelain coat. It is held in position centrally or concentrically with the bowl A by means of a device C, which serves also as a water-conductor, and supported chiefly by fingers or prongs $b$, which project from its under side near the edge and rest upon the sloping base of the bowl, as shown in Fig. 1. The said device or conductor C has a lateral flange $c^4$, Fig. 3, at its top, and its reduced lower end screws into the pipe E. When properly adjusted, the said flange bears upon the surrounding portion of the disk B, so that the latter is pressed downward, and thus held firmly in place, but is at the same time adapted for convenient detachment whenever required.

I provide an attachment C' for the conductor, which is in the nature of a nozzle and water-spreader. The top portion of the same has a concavo-convex form, the convexed side being uppermost. The body $c$ of the spreader is tubular and provided with a transverse partition $c'$, having openings for the passage of water. The sides of said body $c$ are also provided with upwardly-inclined water-discharge openings $c^2$. (Shown best in Fig. 4.) A screw D, having a conical point, is inserted through a threaded hole in the said partition $c'$ and seats in the socket C', to which the spreader proper is attached by means of a screw-joint. The said screw D serves as a regulator for the flow of water received by conductor C from pipe E, which connects with a supply-pipe F, a two-way cock $f$ being provided at the junction of said pipes. When the screw-valve D is adjusted, as shown in Figs. 1 and 3, water flows through the lateral openings $c^2$ in conductor C and impinges upon the under side of the flange of the spreader C' and also flows through openings $c^3$, past the head of the valve, and overflows on the upper side of the spreader. The water thus diverted laterally by the spreader flows over the whole upper surface of the disk B and washes the same, and so it is kept clean under all ordinary circumstances. It will be seen that by rotating and thus adjusting the spreader C' higher or lower its lateral openings $c^2$ may be uncovered more or less and the volume of water discharged therefrom thereby regulated; also, that by adjusting the valve D the flow of water through the conductor C is regulated; further, that the flow through the convergent passages $c^3$ of part C' is also directly regulated by such adjustment of the valve D, since its head is then caused to approach or recede from the partition in which said passages are formed. It will also be apparent that when the part C' is adjusted up or down the valve D may be adjusted at the same time, so as not to vary the pressure of water in conductor C unless this be desired; but by screwing the part C down and the valve D up water may be entirely cut off from openings $c^2$ and caused to discharge through openings $c^3$ and over the convex top of the spreader C'. The impingement of water on the head of the valve D prevents it projecting upward in streams above the spreader C'. From the disk B the water passes down the sides of the bowl and flows into a trap G, located in the tubular neck A' of the spittoon. The said trap consists of a tubular receiving portion $g'$, having lateral openings near its lower contracted end and a cup-like reservoir $g^2$, which is attached to the part G and surrounds the same, as shown. The two parts $g$ and $g^2$ are shown connected by a screw-joint. The trap G is screwed into the tubular neck A', and thus the entire trap may be conveniently removed when occasion requires. The trap prevents the upward escape of gases or odors and also catches particles of gold.

My improved spittoon is particularly adapted for dentists' use; also, as a floor-spittoon in stores, shops, hotels, and other public places, and is also applicable to urinals.

Having thus fully described my invention, what I claim as new, and desire to secure by Letters Patent of the United States, is—

1. The combination with the spittoon-bowl, and a water-pipe arranged centrally therein, of the disk having a central opening and pendent peripheral prongs resting on the sides of the bowl, and a water-conductor passing through said opening and screwing into the pipe, and provided with a flange bearing upon the disk substantially as shown and described.

2. The combination with the bowl, a disk within the same, and a water-conductor passing through the center of said disk, of the spreader, comprising a flanged top, a body provided with lateral orifices opening below the flange and above the disk, and an adjustable connection with the said conductor, substantially as shown and described, to operate as specified.

3. The combination with the bowl and a disk within it, a water-conductor passing through the disk, the flanged spreader connected with said conductor and having lateral orifices opening below the flange and above the disk, and a central screw-valve arranged in the spreader and its head being accessible at the top of said spreader, as shown and described.

4. The combination with the bowl, the disk arranged within it, and the water-conductor passing through the disk, of the spreader having a top flange, a cylindrical body screwing into said conductor, and provided with a transverse partition having orifices, and the screw-valve passing through said partition, its head extending over the said orifices and being accessible at the top of the spreader, as shown and described.

5. The combination, with a spittoon-bowl, and a disk arranged therein as specified, a spreader arranged at the center of and above said disk, and having a tubular body provided with a transverse partition, which partition is provided with openings, of a screw-valve passing through said partition and seating below said partition, whereby it is adapted for regulating the discharge of water through the aforesaid openings and upon the upper side of the spreader, substantially as described.

6. The improved spreader, for use in connection with the spittoon-disk as specified, the same consisting of a concavo-convex portion, and a tubular body having a transverse partition and lateral openings for the discharge of water, substantially as shown and described.

7. The bowl having the cylindrical neck screw-threaded interiorly, and the trap which is insertible in said neck from above, the same comprising a body which is exteriorly screw-threaded and provided with a reduced lower portion having lateral orifices, and a cup closing the lower end of such body and extending up around the same above the orifices, as shown and described.

JOHN CARLISLE BLAIR.

Witnesses:
 CLARENCE B. DAVIS,
 E. G. STEINKAMP.